United States Patent
Lasalle et al.

(10) Patent No.: US 8,086,474 B1
(45) Date of Patent: *Dec. 27, 2011

(54) MANAGING INSURANCE CLAIM DATA (75) Inventors: Craig M. Lasalle, Los Altos, CA (US);
Lisa H. Rogers, Palo Alto, CA (US);
Ellen Linardi, Santa Clara, CA (US);
Beth Goldman, San Francisco, CA
(US); Lavanya Elangovan, San Jose,
CA (US); Maureen Costello, Clarence,
NY (US); Matthew J. Homier, San
Francisco, CA (US)

(73) Assignees: Intuit Inc., Mountain View, CA (US);
Ingenix Inc., Eden Prairie, MN (US)

(*) Notice: Subject to any disclaimer, the term of this patent is extended or adjusted under 35 U.S.C. 154(b) by 332 days.

This patent is subject to a terminal disclaimer.

(21) Appl. No.: 11/830,813

(22) Filed: Jul. 30, 2007

(51) Int. Cl.
G06Q 40/00 (2006.01)

(52) U.S. Cl. ............................................. 705/4; 705/35

(58) Field of Classification Search ........................ 705/4
See application file for complete search history.

(56) References Cited

U.S. PATENT DOCUMENTS

| | | | | |
|---|---|---|---|---|
| 6,324,516 B1* | 11/2001 | Shults et al. | ...................... | 705/2 |
| 6,341,265 B1* | 1/2002 | Provost et al. | ...................... | 705/4 |
| 6,826,536 B1* | 11/2004 | Forman | .............................. | 705/4 |
| 6,934,692 B1* | 8/2005 | Duncan | ............................ | 705/35 |
| 7,340,401 B1* | 3/2008 | Koenig et al. | ........................ | 705/2 |
| 7,356,516 B2* | 4/2008 | Richey et al. | ................... | 705/80 |
| 7,395,219 B2* | 7/2008 | Strech | ................................ | 705/4 |
| 7,438,218 B2* | 10/2008 | Dooley et al. | ................ | 235/378 |
| 7,464,040 B2* | 12/2008 | Joao | .................................. | 705/2 |
| 7,467,094 B2* | 12/2008 | Rosenfeld et al. | ................. | 705/3 |
| 7,657,441 B2* | 2/2010 | Richey et al. | ................... | 705/1.1 |
| 2002/0077867 A1* | 6/2002 | Gittins et al. | ...................... | 705/4 |
| 2002/0091549 A1* | 7/2002 | Provost et al. | ...................... | 705/4 |
| 2003/0158759 A1* | 8/2003 | Kannenberg | ........................ | 705/4 |
| 2003/0225690 A1* | 12/2003 | Eaton | .............................. | 705/40 |
| 2003/0233292 A1* | 12/2003 | Richey et al. | ................... | 705/28 |
| 2004/0153382 A1* | 8/2004 | Boccuzzi et al. | ................. | 705/34 |
| 2004/0193456 A1* | 9/2004 | Kellington | ........................ | 705/4 |
| 2006/0247947 A1* | 11/2006 | Suringa | .............................. | 705/2 |
| 2007/0005404 A1* | 1/2007 | Raz et al. | ............................ | 705/4 |
| 2007/0011031 A1* | 1/2007 | Bregante et al. | .................. | 705/4 |
| 2007/0011032 A1* | 1/2007 | Bregante et al. | .................. | 705/4 |
| 2007/0136100 A1* | 6/2007 | Daugherty et al. | ............... | 705/3 |
| 2007/0136106 A1* | 6/2007 | Hart et al. | .......................... | 705/4 |
| 2008/0059351 A1* | 3/2008 | Richey et al. | ................... | 705/35 |
| 2008/0177577 A1* | 7/2008 | Olaniyan | ........................... | 705/3 |
| 2008/0228531 A1* | 9/2008 | Kenedy et al. | .................... | 705/4 |
| 2009/0094071 A1* | 4/2009 | Kwan | ............................... | 705/4 |

* cited by examiner

Primary Examiner — Kirsten Apple
(74) Attorney, Agent, or Firm — Osha • Liang LLP

(57) ABSTRACT

A method for managing insurance claim data involves identifying a first insurance claim data and a second insurance claim data using pattern recognition on multiple insurance claim data associated with an insured party, where the first insurance claim data and the second insurance claim data are associated with a single insurance claim associated with the insured party, where the second insurance claim data is later in time than the first insurance claim data, and where the second insurance claim data includes a modification of the single insurance claim relative to the first insurance claim data. The method further involves determining a financial responsibility of the insured party for the single insurance claim based on the second insurance claim data, and presenting the first insurance claim data, the second insurance claim data, and the financial responsibility in a graphical user interface (GUI).

21 Claims, 6 Drawing Sheets

Graphical user interface 300

FIGURE 2

Claim Details

Insurance claim overview 302
- Insurance Name
- 1-800-000-0000
- Date of Service: 5/17/06
- Patient: John Doe
- This claim was reprocessed on 6/11/2006
- Claim #1234567890
- Provider: Jane Doe M.D.
- In-Network
- Tel. 123-123-1234

Billing summary 304
- My Responsibility = I paid $20.00 (copay) + I owe Jane Doe M.D. $320.00
- $340
- Edit | Mark as Paid

Claim help link 310
- Questions about this claim?
  - Determine if what you owe is correct
  - Fix common problems
  - Learn how to address denied services
- Launch Claim Assistance

Insurance claim details 306

| Service | Amt. Billed | Amt. Allowed | Insurance Paid | My Responsibility |
|---|---|---|---|---|
| Abd. CT scan | 150.00 | 80.00 | 80.00 | 0.00 | $ |
| Blood sugar | 50.00 | 30.00 | 10.00 | 20.00 | $ |
| Liver hormone | 320.00 | 320.00 | Denied | 320.00 | $ |
| Totals | $520.00 | $430.00 | $90.00 | $340.00 |

Notes feature 308
- Insert Time Stamp
- Capture key questions, requests, and responses.

Dispute feature 312
- ☐ Disputed
- ? 🖨 Write a Letter

General interface commands 314
- OK | Cancel

Graphical user interface 300

Insurance claim details 402

| Service | | Amt. Billed | Amt. Allowed | Insurance Paid | My Responsibility | |
|---|---|---|---|---|---|---|
| *i* | Abd. CT scan | 150.00 | 80.00 | 80.00 | 0.00 | $ |
| *i* | ~~Abd. CT scan~~ | ~~150.00~~ | ~~80.00~~ | ~~0.00~~ | ~~80.00~~ | ? |
| *i* | Blood sugar | 50.00 | 30.00 | 10.00 | 20.00 | $ |
| *i* | Liver hormone | 320.00 | 320.00 | Denied | 320.00 | $ |
| Totals | | $520.00 | $430.00 | $90.00 | $340.00 | |

FIGURE 4B

Change history 404

Change History

Claim # 1234567890 was reprocessed on 6/11/2006

| | Amt. Billed | Amt. Allowed | Insurance Paid | My Resp. |
|---|---|---|---|---|
| 06/11/2006 | | | | |
| Added: Abdominal CT scan | 150.00 | 80.00 | 80.00 | 0.00 |
| Removed: Abdominal CT scan | 150.00 | 80.00 | 0.00 | 80.00 |
| Patient was changed from Jack Doe to John Doe | | | | |
| 05/28/2006 | | | | |

OK

| Service | Amt. Billed | Amt. Allowed | Insurance Paid | My Responsibility | |
|---|---|---|---|---|---|
| ~~Abd. CT scan~~ | ~~150.00~~ | ~~80.00~~ | ~~80.00~~ | ~~0.00~~ | ? |
| ~~Blood sugar~~ | ~~50.00~~ | ~~30.00~~ | ~~10.00~~ | ~~20.00~~ | ? |
| ~~Liver hormone~~ | ~~320.00~~ | ~~320.00~~ | ~~Denied~~ | ~~320.00~~ | ? |
| Totals | $0.00 | $0.00 | $0.00 | $0.00 | |

Insurance claim details 502

MANAGING INSURANCE CLAIM DATA

BACKGROUND

An insurance claim is a request for an insurance provider to assume financial responsibility for a loss covered by an insurance policy. Many different types of losses may be insured, such as damage to a vehicle or home, medical conditions, death, identity theft, loss of wages due to disability or unemployment, or any other type of insurable loss.

Often, when an insurable loss occurs, a business entity is employed to provide a service associated with the loss. For example, a doctor may be employed to provide medical treatment, an auto mechanic may be employed to repair a damaged vehicle, a building contractor may be employed to repair a damaged home, or a funeral parlor may be employed to manage funeral services. Many different types of service providers exist, and in some cases a single service provider may provide multiple services. For example, a single visit to a hospital may involve multiple medical treatments. The amount of financial responsibility assumed by the insurance provider is generally related to the specific services provided. Thus, an insurance claim typically lists the service(s) provided and the amount(s) billed by the service provider.

In some cases, the insurance provider only assumes partial financial responsibility for a given service, and the insured party is responsible for the remaining amount. For example, medical insurance policies typically require the insured party to pay a co-pay and/or deductible corresponding to a fixed amount or percentage of the medical bill. Further, one or more services included in the insurance claim may not be covered by the insurance policy, in which case the insurance provider may reject the uncovered portion of the insurance claim and defer full financial responsibility for the uncovered portion to the insured party.

In some cases, after an insurance claim is filed, the insurance claim may need to be adjusted and/or reprocessed. For example, the insurance claim may need adjustment if it contains erroneous information, such as an incorrect bill amount, an incorrect date or location of service, an incorrect drug or treatment code, a typographical error, or any other type of erroneous information that requires an adjustment to an insurance claim. An adjusted insurance claim may then be reprocessed, to determine whether the insurance provider's and/or insured party's financial responsibilities have changed due to the adjustment.

An insurance claim may also be reprocessed if the insurance provider made an error during initial processing of the insurance claim. For example, the insurance provider may have failed to calculate the correct amount of financial responsibility, or may have incorrectly rejected the insurance claim. Such errors may be caused, for example, by a software bug or data entry error. Those skilled in the art will appreciate that many different conditions exist in which an insurance claim may need to be adjusted and/or reprocessed.

In cases where an insurance claim is reprocessed, the burden generally falls on the insured party to determine the remaining financial responsibility for the insurance claim. Typically, this is accomplished by the insured party maintaining a physical set of insurance-related documentation, such as mailed insurance statements, service providers' bills, or any other type of insurance-related documentation. When the insurance provider mails updated information about the insurance claim to the insured party, the insured party must physically compare the most recent mailing with earlier documentation to determine whether their financial responsibility has changed.

SUMMARY

In general, in one aspect, the invention relates to a method for managing insurance claim data. The method comprises identifying a first insurance claim data and a second insurance claim data using pattern recognition on a plurality of insurance claim data associated with an insured party, wherein the first insurance claim data and the second insurance claim data are associated with a single insurance claim associated with the insured party, wherein the second insurance claim data is later in time than the first insurance claim data, and wherein the second insurance claim data comprises a modification of the single insurance claim relative to the first insurance claim data. The method further comprises determining a financial responsibility of the insured party for the single insurance claim based on the second insurance claim data, and presenting the first insurance claim data, the second insurance claim data, and the financial responsibility in a graphical user interface (GUI).

In general, in one aspect, the invention relates to a system. The system comprises an insurance claim data repository configured to store a plurality of insurance claim data associated with an insured party. The system further comprises an insurance claim data manager configured to identify a first insurance claim data and a second insurance claim data using pattern recognition on the plurality of insurance claim data, wherein the first insurance claim data and the second insurance claim data are associated with a single insurance claim associated with the insured party, wherein the second insurance claim data is later in time than the first insurance claim data, and wherein the second insurance claim data comprises a modification of the single insurance claim relative to the first insurance claim data. The insurance claim data manager is further configured to determine a financial responsibility of the insured party for the single insurance claim based on the second insurance claim data, and present the first insurance claim data, the second insurance claim data, and the financial responsibility in a graphical user interface (GUI).

In general, in one aspect, the invention relates to a graphical user interface (GUI) presenting insurance claim data to an insured party. the GUI comprises a first insurance claim data and a second insurance claim data, wherein the first insurance claim data and the second insurance claim data are associated with a single insurance claim associated with the insured party, wherein the second insurance claim data is later in time than the first insurance claim data, and wherein the second insurance claim data comprises a modification of the single insurance claim relative to the first insurance claim data. The GUI further comprises a financial responsibility of the insured party for the single insurance claim, wherein the financial responsibility is based on the second insurance claim data.

In general, in one aspect, the invention relates to a computer readable medium. The computer readable medium comprises executable instructions to identify a first insurance claim data and a second insurance claim data using pattern recognition on a plurality of insurance claim data associated with an insured party, wherein the first insurance claim data and the second insurance claim data are associated with a single insurance claim associated with the insured party, wherein the second insurance claim data is later in time than the first insurance claim data, and wherein the second insurance claim data comprises a modification of the single insurance claim relative to the first insurance claim data. The computer readable medium further comprises executable instructions to determine a financial responsibility of the insured party for the single insurance claim based on the second insurance claim data, and present the first insurance claim data, the second insurance claim data, and the financial responsibility in a graphical user interface (GUI).

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for managing insurance claim data. Insurance claim data associated with an insured party is obtained from an insurance server. Pattern matching is performed on the insurance claim data to identify related insurance claim data, i.e., insurance claim data relating to a single insurance claim. The related insurance claim data is used to determine the insured party's financial responsibility for the insurance claim, and the insured party's financial responsibility is then presented to a user.

Figure 1:
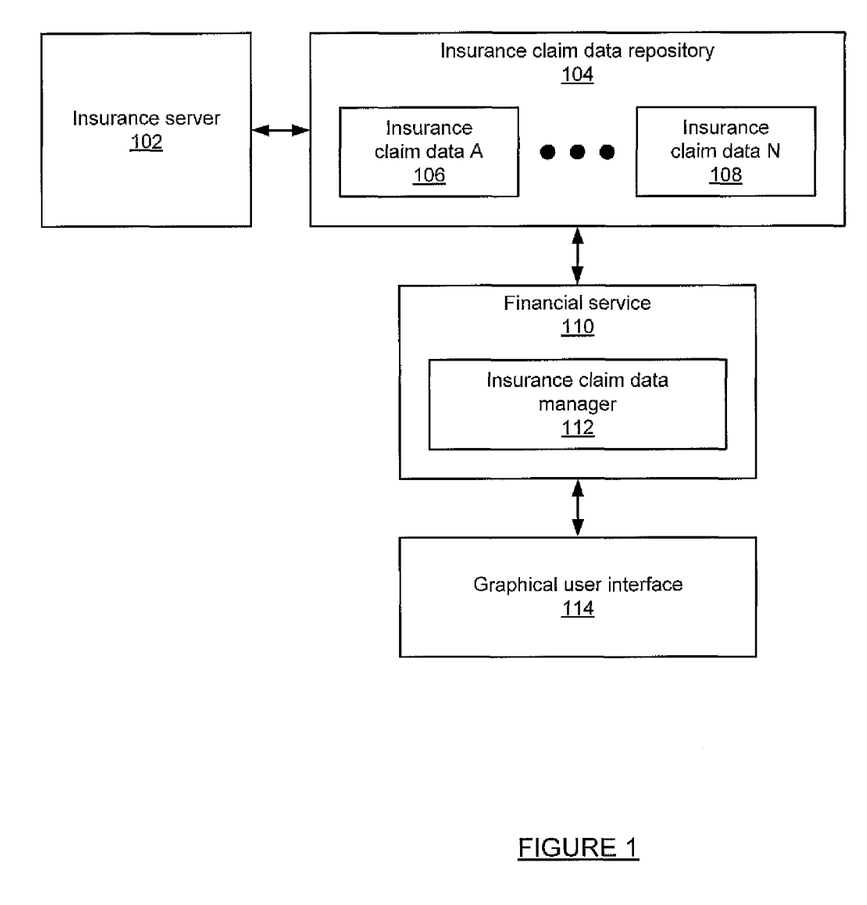
FIG. 1 shows a diagram of a system in accordance with one or more embodiments of the invention.

FIG. 1 shows a diagram of a system in accordance with one or more embodiments of the invention. The system includes an insurance server (102) configured to provide insurance claim data (e.g., insurance claim data A (106), insurance claim data N (108)) for storage in an insurance claim data repository (104). The insurance claim data repository (104) may be a database, an extensible markup language (XML) file, a text file, a spreadsheet, or any other type of data repository. In one or more embodiments, the insurance claim data repository (104) is stored in a data server (not shown) communicatively coupled with the insurance server (102).

The insurance claim data includes data describing insurance claims, such as the insurance provider's name and/or contact information, the insurance claim number, the date of service, the service provider's name and/or contact information, the insured party's name and/or contact information, the date the insurance claim was processed by the insurance provider, the type of service(s) provided, the amount billed for each service, the amount allowed by the insurance policy, the amount paid by the insurance provider, the insured party's financial responsibility, any other type of data associated with insurance claims, or any combination thereof.

The system also includes a financial service (110) configured to access the insurance claim data repository (104) and obtain insurance claim data. The financial service (110) includes an insurance claim data manager (112) configured to identify related insurance claim data and use the related insurance claim data to determine the insured party's financial responsibility for an insurance claim. The financial service (110) may be a hosted service (e.g., a web service or any other type of backend service), an execution thread in a stand-alone end-user application, any other type of service, or any combination thereof. Depending on the type of service used, the insurance claim data manager (112) may be a package, a class, a method, an executable file, any other type of service component, or any combination thereof.

Further, the financial service (110) is configured to provide results from the insurance claim data manager (112) for display in a graphical user interface (GUI) (114). The GUI (114) may be a web page, a window in a stand-alone end-user application, a display on a mobile device (e.g., a personal digital assistant (PDA), a cellular telephone, or any other type of mobile device), or any other type of interactive computer display. More specifically, the GUI (114) is configured to display the insured party's financial responsibility for an insurance claim in the context of related insurance claim data.

In one or more embodiments, the insurance server (102) is hosted by the insurance provider, while the insurance claim data repository (104) and financial service (110) may be hosted by a third-party financial services provider. Alternatively, any other system configuration may be used. For example, the insurance server (102), insurance claim data repository (104), and financial service (110) may all be hosted by the insurance provider. Further, the elements may be communicatively coupled via any type of network connection, or any combination thereof. The specific system configuration used may be motivated by any number of factors, such as business agreements, technical constraints, etc. Accordingly, embodiments of the invention should not be considered limited to any specific system configuration.

Figure 2:
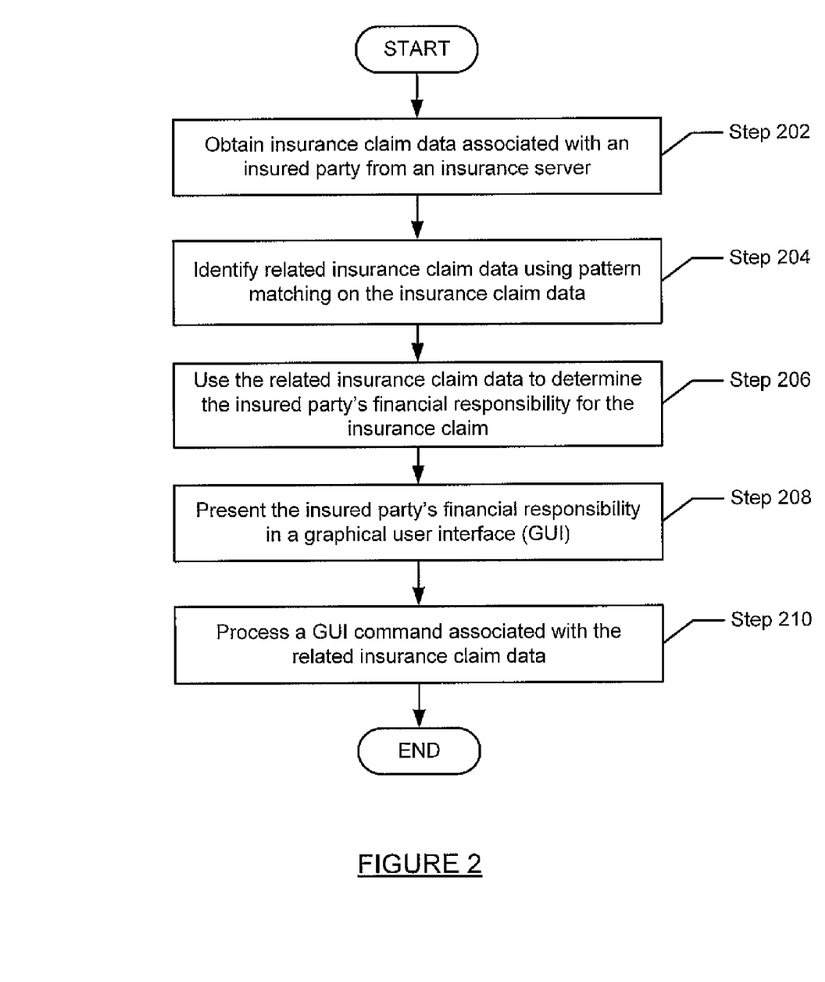
FIG. 2 shows a flowchart of a method for managing insurance claim data in accordance with one or more embodiments of the invention.

FIG. 2 shows a flowchart of a method for managing insurance claim data in accordance with one or more embodiments of the invention. In one or more embodiments, one or more of the steps shown in FIG. 2 may be omitted, repeated, and/or performed in a different order. Accordingly, the specific arrangement of steps shown in FIG. 2 should not be construed as limiting the scope of the invention.

In one or more embodiments, in Step 202, insurance claim data associated with an insured party is obtained from an insurance server (e.g., insurance server (102) of FIG. 1). The insured party may be an individual, a family, a business, or any other type of insurable entity. In one or more embodiments, obtaining the insurance claim data involves querying the insurance server for insurance claim data associated with the insured party, and receiving the insurance claim data in response to the query. The insurance claim data obtained from the insurance server may then be stored in an insurance claim data repository (e.g., insurance claim data repository (104) of FIG. 1).

In one or embodiments, in Step 204, pattern matching is performed on the insurance claim data to identify related insurance claim data, i.e., insurance claim data relating to a single insurance claim. In one or more embodiments, the pattern matching is performed by an insurance claim data manager in a financial service (e.g., insurance claim data manager (112) of FIG. 1).

In one or more embodiments, the pattern matching involves iterating through the related insurance claim data and comparing one or more designated fields in the insurance claim data. For example, the insurance provider may provide an identity field in each of the insurance claim data, where related insurance claim data all have the same identity field.

Alternatively (for example, if an identity field is not available), other fields may be used to make a "best guess" determination that two or more insurance claim data are related. For example, the pattern matching may identify insurance claim data having an identical date of service, insurance providers, name of the party receiving the service (who may be different from the insured party), service provider, any other insurance claim data field, or any combination thereof. In one or more embodiments, relationships identified using a "best guess" method may be presented to a user for approval or rejection.

In one or more embodiments, in Step 206, the related insurance claim data is used to determine the insured party's financial responsibility for the insurance claim. As discussed above, an insurance claim may be adjusted and/or reprocessed for a variety of reasons. Depending on the type of adjustment and/or reprocessing, the insured party's financial responsibility for the insurance claim may change. Therefore, two or more of the related insurance claim data may indicate different financial responsibilities for the insured party. Accordingly, determining the insured party's financial responsibility involves determining which of the related insurance claim data is most recent, i.e., later in time. The most recent insurance claim data corresponds to the most recent adjustment and/or reprocessing, and therefore includes the correct amount of financial responsibility.

In one or more embodiments, in Step 208, the insured party's financial responsibility is displayed in a GUI (e.g., GUI (114) of FIG. 1). Further, in Step 210, a GUI command associated with the related insurance claim data may be processed, in response to user input via the GUI. Examples of GUI commands are discussed below with respect to FIGS. 3-5.

Figure 3:
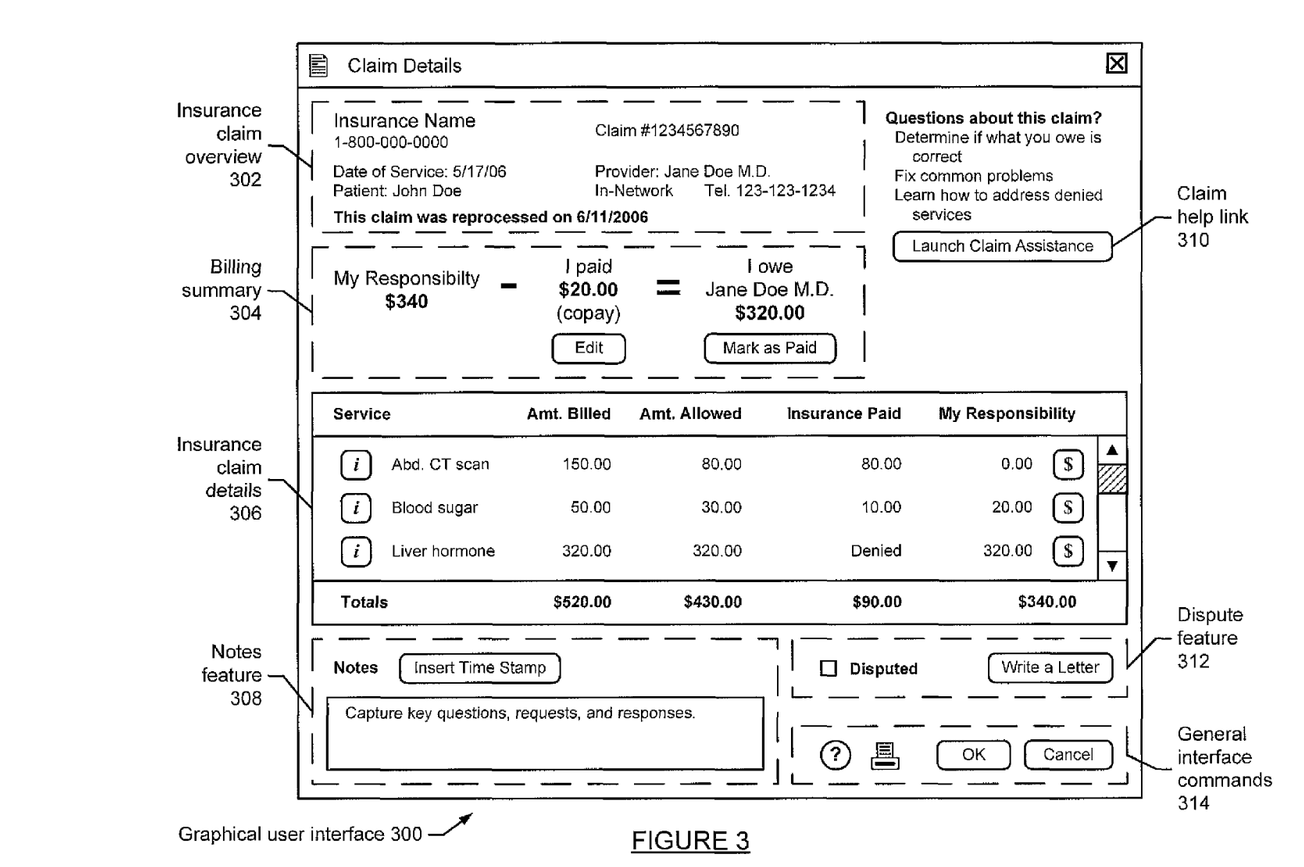
FIGS. 3-5 show diagrams of graphical user interfaces in accordance with one or more embodiments of the invention.
Figure 4A:
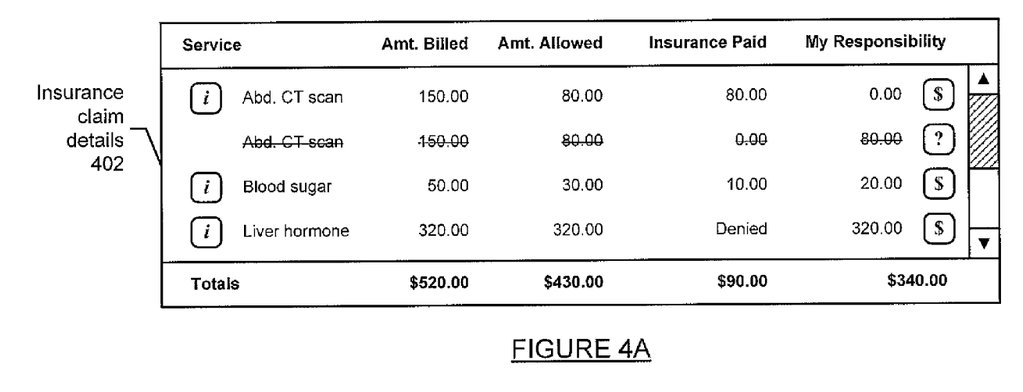
Figure 4B:
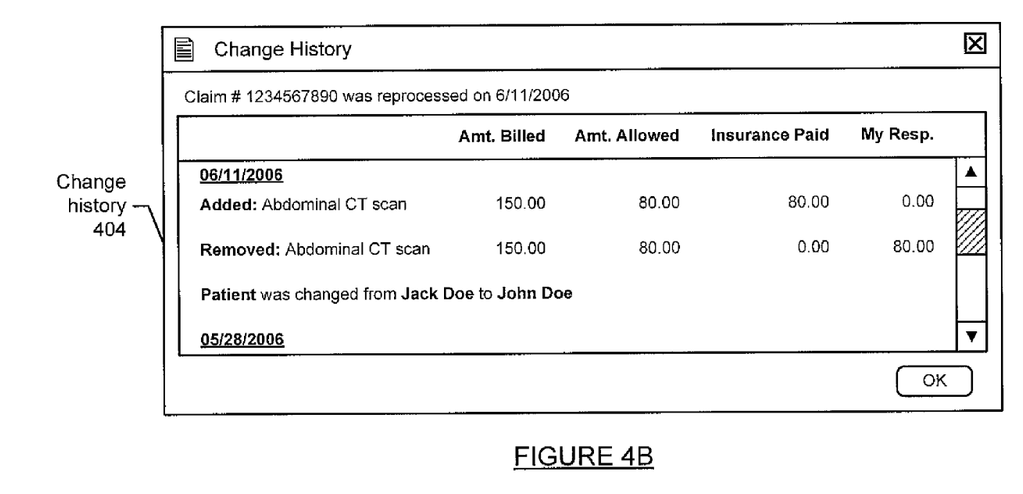
Figure 5:
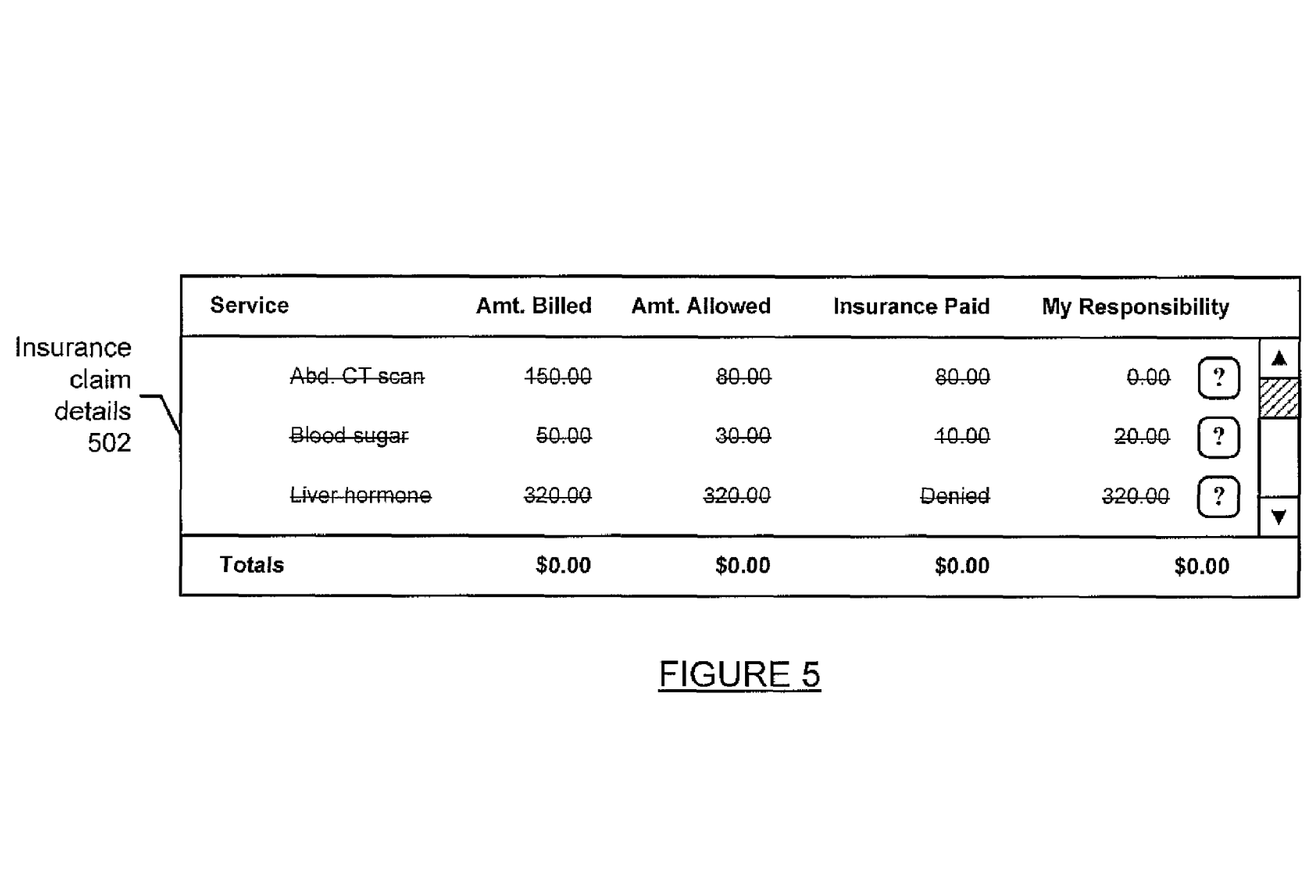

FIGS. 3-5 show diagrams of graphical user interfaces in accordance with one or more embodiments of the invention. These graphical user interfaces are provided for exemplary purposes only, and should not be construed as limiting the scope of the invention. For example, in one or more embodiments, one or more of the elements shown in FIGS. 3-5 may have a different visual appearance or may be omitted altogether. Further, many different types of display elements and/or GUI controls may be used to implement functionality described below.

FIG. 3 shows a diagram of a GUI (300) configured to display insurance claim data. Specifically, the GUI (300) is configured to display information about the most recent status of an insurance claim, including the insured party's current financial responsibility, based on processing of related insurance claim data as described above. In one or more embodiments, the GUI (300) is designed to be presented directly to the insured party, so that the insured party can take an appropriate action concerning the insurance claim. Those skilled in the art will appreciate that the GUI (300) may be presented to a variety of users, such as customer service representatives, legal guardians, third party administrators, etc.

In one or more embodiments, the GUI (300) includes an insurance claim overview (302). The insurance claim overview (302) includes general information about the insurance claim, such as the insurance provider's name and/or contact information, the insurance claim number assigned by the insurance provider, the date of service(s), the service provider's name and/or contact information, the insured party's name, a general history of the insurance claim (e.g., whether the insurance claim has been adjusted and/or reprocessed), any other type of general insurance claim information, or any combination thereof.

In one or more embodiments, the GUI (300) includes a billing summary (304). The billing summary (304) provides a summary of the insured party's financial responsibility for all services included in the insurance claim. For example, the billing summary (304) may list the insured party's total financial responsibility, the amount (if any) of the financial responsibility that the insured party has already paid, and the amount of the financial responsibility remaining. In one or more embodiments, the billing summary (304) includes a control to open an interface (not shown) for editing (i.e., increasing or decreasing) the amount the insured party has paid. This interface may also allow a user to submit a payment to a service provider via some type of electronic payment service. In one or more embodiments, editing the amount paid results in a corresponding change of the amount remaining. Further, the billing summary may include a control for marking the entire amount as paid.

In one or more embodiments, the GUI (300) includes insurance claim details (306) about the insurance claim. Examples of possible variations on the insurance claim details (306) are discussed below with respect to FIGS. 4A, 4B, and 5. More generally, the insurance claim details (306) include details about the specific service(s) provided and the financial responsibilities associated with the insurance claim (i.e., the insurance provider's financial responsibility and/or the insured party's financial responsibility). For example, the insurance claim details (306) may include names of the service(s) included in the insurance claim, the amount(s) billed by the service provider for each service, the amount(s) allowed by the insurance provider for each service, the amount(s) the insurance provider has paid to the service provider and/or the insured party, the insured party's financial responsibility for each service, any other similar details about the insurance claim, or any combination thereof. The insurance claim details (306) may also include totals for one or more of the aforementioned values.

Further, in one or more embodiments, the insurance claim details (306) include commands to view detailed descriptions (not shown) of the service(s) listed. For example, FIG. 3 shows information icons to the left of each service name, which may each be linked to detailed descriptions of some or all of the services. For example, a detailed description of a medical appointment may include a diagnosis resulting from the medical appointment. The insurance claim details (306) may also include links to billing histories (not shown) for some or all of the services. For example, FIG. 3 shows dollar icons to the right of the insured party's financial responsibility for each service, which may be linked to billing histories for some or all of the services.

In one or more embodiments, the GUI (300) includes a notes feature (308). The notes feature (308) allows a user to manually record information about the insurance claim. For example, if the user speaks with a customer service representative (CSR) from the insurance provider or service provider, the user may use notes feature (308) to take notes about the conversation. In one or more embodiments, the notes feature (308) includes a time stamp button for automatically entering the current date and time into the textbox.

In one or more embodiments, the GUI (300) includes a dispute feature (312). The dispute feature (312) allows the user to indicate, via a checkbox or similar control, whether the insurance claim has been disputed. The dispute feature (312) may also include a link to a dispute letter generator (not shown), where the dispute letter generator is configured to automatically populate a dispute letter with relevant insurance claim data. For example, the dispute letter may be automatically populated with the name of the insured party, the claim number, the date of service, any other type of information typically included in a dispute letter, or any combination thereof. Thus, the dispute feature (312) may allow the user to generate a dispute letter for the insurance claim with minimal input required. The dispute letter may then be sent to the insurance provider and/or the service provider.

In one or more embodiments, the GUI (300) includes a claim help link (310). The claim help link (310) is a command to view a help interface (not shown) providing information about common insurance claim questions. For example, the help interface may provide guidance on verifying that the displayed financial responsibilities are correct, how to dispute an insurance claim, any other type of claim-related issues, or any combination thereof. In one or more embodiments, information provided by the claim help link (310) is contextual, i.e., directed to aspects of the particular insurance claim in question.

In one or more embodiments, the GUI (300) includes general interface commands (314), which are commands not specifically associated with any particular element of the GUI (300). For example, the general interface commands (314) may include a command to view a general help interface (not shown) providing information about how to use the various elements included in the GUI (300). Further, the general interface commands (314) may include a command to print insurance claim data displayed in the GUI (300).

In one or more embodiments, the general interface commands (314) include an "OK" button for accepting any changes to the GUI (300) (e.g., changes to the amount paid, notes, dispute checkbox, etc.). The general interface commands (314) may also include a "Cancel" button for cancelling any such changes to the GUI (300). In one or more embodiments, selecting the "OK" button and/or the "Cancel" button closes the GUI (300), and may transfer the user to a different interface (not shown), such as a different web page if the GUI (300) is displayed in a web browser.

In one or more embodiments, information entered by the user into the GUI (300) (e.g., notes, payment amounts, disputes, etc.) is stored along with other insurance data in an insurance claim data repository (e.g., insurance claim data repository (104) of FIG. 1). Further, information entered by the user may be communicated to an insurance server (e.g., insurance server (102) of FIG. 1). In other words, the GUI (300) may allow the user to store and/or modify information about the insurance claim that is then accessible to other interested parties (e.g., the insurance provider, the service provider, a customer service representative, etc.).

FIG. 4A shows a diagram of insurance claim details (402) in accordance with one or more embodiments of the invention. Specifically, FIG. 4A shows an example where the financial responsibilities for an insurance claim have been modified due to an adjustment and/or reprocessing of the insurance claim. In this example, the insurance provider erroneously failed to assume its financial responsibility of $80.00 for an abdominal computed tomography (CT) scan, and the full financial responsibility was passed on to the insured party.

FIG. 4A does not indicate the cause of the error, although one or more embodiments of the insurance claim details (402) may include such information. Regardless of the specific reason for the error, the incorrect insurance claim data is crossed out based on more recent insurance claim data. The more recent insurance claim data indicates that the insurance provider has paid the full $80.00 for the abdominal CT scan, and the insured party does not bear any financial responsibility for the service. Based on the information shown in FIG. 4A, the insured party would know to ignore any bills for the $80.00.

In FIG. 4A, a question mark is shown adjacent to the crossed-out insurance claim data. In one or more embodiments, the question mark (or any other similar command) is a link to a change history for the insurance claim. FIG. 4B shows a diagram of a change history (404) in accordance with one or more embodiments of the invention. Specifically, the change history (404) continues the example shown in FIG. 4A, and includes information indicating that the insurance claim was reprocessed. Further, the change history (404) provides details about the reprocessing, such as the type of change entered for each service, any effects the changes may have had on financial responsibilities, and the date when each change was entered. More generally, embodiments of the change history (404) provide a detailed view of an insurance claim's history, which may be used when determining an appropriate action to take regarding the insurance claim.

FIG. 5 shows a diagram of another example of insurance claim details (502) in accordance with one or more embodiments of the invention. In this example, the insurance claim has been reversed, as indicated by the fact that all the services are crossed out. Further, each service has an adjacent question mark. In one or more embodiments, each question mark is a link to a change history similar to the change history described above.

Embodiments of the invention provide a GUI that may be presented directly to the insured party. Thus, embodiments of the invention allow the insured party to easily determine their financial responsibility for an insurance claim, in the context of related insurance claim data. In particular, adjusted and/or reprocessed insurance claims may be automatically reconciled by a computer system, without requiring the insured party to manually search through physical insurance-related documentation. The insured party may also be able to view the history of the insurance claim. Thus, embodiments of the invention reduce the amount of ambiguity generally associated with adjusted and/or reprocessed insurance claims, thereby facilitating management of insurance claim data by the insured party.

Further, one or more embodiments of the GUI include functionality to not only view financial responsibility associated with an insurance claim, but also to control information about the insurance claim. Controllable information may include payment histories, notes about the insurance claim, dispute histories, or any other type of information about the insurance claim. Thus, the GUI may effectively allow the insured party to manage aspects of their own insurance claim. Moreover, information generated and/or modified by the insured party in the GUI may then be stored in an insurance claim data repository and/or communicated to an insurance server, for access by other interested parties.

Figure 6:
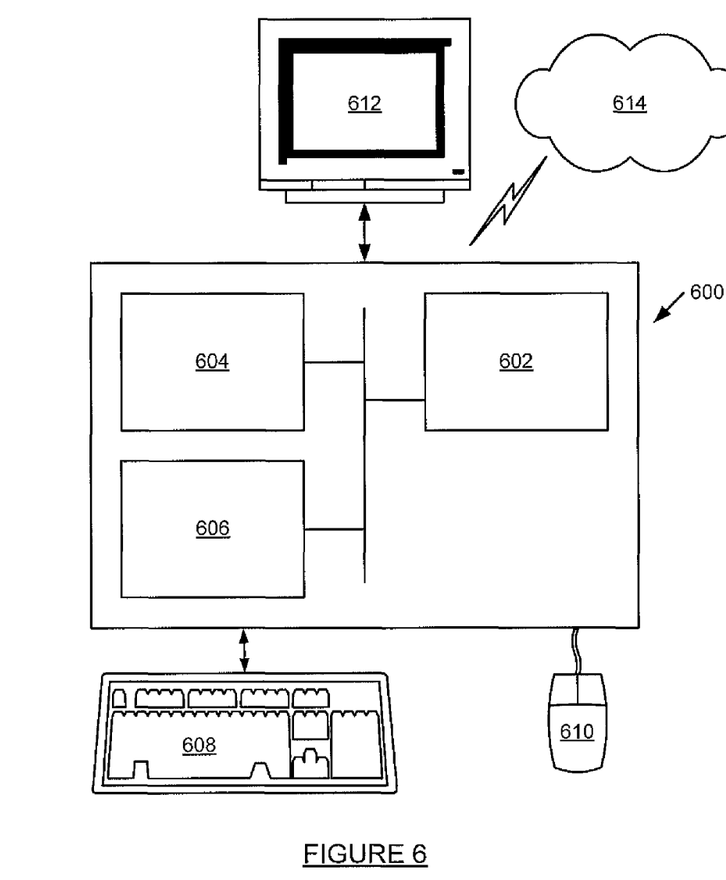
FIG. 6 shows a diagram of a computer system in accordance with one or more embodiments of the invention.

Embodiments of the invention may be implemented on virtually any type of computer regardless of the platform being used. For example, as shown in FIG. 6, a computer system (600) includes a processor (602), associated memory (604), a storage device (606), and numerous other elements and functionalities typical of today's computers (not shown). The computer (600) may also include input means, such as a keyboard (608) and a mouse (610), and output means, such as a monitor (612). The computer system (600) may be connected to a network (614) (e.g., a local area network (LAN), a wide area network (WAN) such as the Internet, or any other similar type of network) via a network interface connection (not shown). Those skilled in the art will appreciate that these input and output means may take other forms.

Further, those skilled in the art will appreciate that one or more elements of the aforementioned computer system (600) may be located at a remote location and connected to the other elements over a network. Further, embodiments of the invention may be implemented on a distributed system having a plurality of nodes, where each portion of the invention (e.g., insurance server, insurance claim data repository, financial service, GUI, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for calculating a financial responsibility, comprising:
   accessing, by a software application executing on a computer processor and operated by a party selected from a group consisting of a patient and a relative of the patient, a repository of a medical insurance provider (MIP);
   searching, by the software application operated by the party, a plurality of entries in the repository of the MIP based on a date;
   retrieving, in response to searching and by the software application operated by the party, an entry in the repository corresponding to the date and identifying a first medical procedure (MP) performed on the patient by a medical service provider (MSP), an amount billed to the party for the first MP, a second MP performed on the patient; and an amount billed to the party for the second MP;
   retrieving, in response to searching and by the software application operated by the party, an adjusted entry in the repository corresponding to the date and identifying the first MP and an adjusted amount billed to the party for the first medical procedure;
   determining, by the software application operated by the party, that the adjusted entry is a revision of the entry based on the adjusted entry being more recent than the entry;
   calculating, by the software application operated by the party, the financial responsibility of the party for the first MP and the second MP by summing the adjusted amount and the amount billed to the patient for the second MP; and
   generating, by the software application operated by the party, a graphical user interface (GUI) identifying the first MP, the amount billed to the party for the first MP, an indication the amount billed to the party for the first MP is incorrect, the adjusted amount, the second medical procedure, the amount billed to the party for the second MP, and the financial responsibility of the party.

2. The method of claim 1, further comprising:
   processing a GUI command associated with the first MP.

3. The method of claim 2, wherein the GUI command comprises editing an amount of the financial responsibility already paid by the party.

4. The method of claim 2, wherein the GUI command comprises accessing a diagnosis of the first MP.

5. The method of claim 2, wherein the GUI command comprises storing a note generated by the party and associated with the adjusted amount in the adjusted entry.

6. A system for determining a financial responsibility comprising:
   a computer processor; and
   an insurance claim data manager (ICDM) executing on the computer processor and operated by a party selected from a group consisting of a patient and a relative of the patient, the ICDM configured to:
   access a repository of a medical insurance provider (MIP);
   search a plurality of entries in the repository of the MIP based on a date;
   retrieve, in response to searching, an entry in the repository corresponding to the date and identifying a first medical procedure (MP) performed on the patient by a medical service provider (MSP), an amount billed to the party for the first MP, a second MP performed on the patient, and an amount billed to the party for the second MP;
   retrieve, in response to searching, an adjusted entry in the repository corresponding to the date and identifying the first MP and an adjusted amount billed to the party for the first MP;
   determine that adjusted entry is a revision of the entry based on the adjusted entry being more recent than the entry;
   calculate the financial responsibility of the party for the first MP and the second MP by summing the adjusted amount and the amount billed to the party for the second MP; and
   generate, a graphical user interface (GUI) comprising the first MP, the amount billed to the party for the first MP, an indication the amount billed to the party for the first MP is incorrect, the adjusted amount, the second MP, the amount billed to the party for the second MP, and the financial responsibility of the party.

7. The system of claim 6, wherein the insurance claim data manager is further configured to:
   process a GUI command associated with the first MP.

8. The system of claim 7, wherein the GUI command comprises editing an amount of the financial responsibility already paid by the party.

9. The system of claim 7, wherein the GUI command comprises accessing a diagnosis associated with the first MP.

10. The system of claim 7, wherein the GUI command comprises storing a note generated by the party and associated with the adjusted amount in the adjusted entry.

11. A non-transitory computer readable storage medium storing instructions for calculating a financial responsibility, the instructions executable on a processor and comprising functionality for:
   accessing, for a party selected from a group consisting of a patient and a relative of the patient, a repository of a medical insurance provider (MIP);
   searching a plurality of entries in the repository of the MIP based on a date;
   retrieving, in response to searching, a first entry in the repository corresponding to the date and identifying a first medical procedure (MP) performed on the patient by a medical service provider (MSP), an amount billed to the party for the first MP, a second MP performed on the patient, and an amount billed to the party for the second MP;

retrieving, in response to searching, an adjusted entry in the repository corresponding to the date and identifying the first MP and an adjusted amount billed to the party for the first MP;

determining that the adjusted entry is a revision of the entry based on the adjusted entry being more recent than the entry;

calculating the financial responsibility of the party by summing the adjusted amount and the amount billed to the party for the second MP;

generating a graphical user interface (GUI) identifying the first MP, the amount billed to the party for the first MP, an indication the amount billed to the party for the first MP is incorrect, the second MP, the amount billed to the party for the second MP, and the financial responsibility of the party.

12. The non-transitory computer readable storage medium of claim 11, further comprising executable instructions to:
process a GUI command associated with the first MP.

13. The non-transitory computer readable storage medium of claim 12, wherein the GUI command comprises editing an amount of the financial responsibility already paid by the party.

14. The non-transitory computer readable storage medium of claim 12, wherein the GUI command comprises accessing a diagnosis of the first MP.

15. The non-transitory computer readable storage medium of claim 12, wherein the GUI command comprises recording a note generated by the party and associated with the adjusted amount in the adjusted entry.

16. The method of claim 1, further comprising:
marking, by the software application operated by the party, the financial responsibility as a disputed amount;
populating, automatically and by the software application operated by the party, a dispute letter for the disputed amount comprising the financial responsibility of the party; and
sending, electronically and by the software application operated by the party, the dispute letter to the MIP.

17. The method of claim 1, further comprising:
identifying a medical bill transmitted to the party for the first MP and based on the entry, wherein the medical bill is transmitted after creation of the entry and before creation of the adjusted entry;
determining that the medical bill is invalid based on the adjusted entry; and
transmitting a message to the party indicating that that medical bill is invalid.

18. The system of claim 6, the ICDM further comprising functionality to:
mark the financial responsibility as a disputed amount;
automatically populate a dispute letter for the disputed amount comprising the financial responsibility of the party; and
electronically send the dispute letter to the MIP.

19. The system of claim 6, wherein the insurance claim data manager is further configured to:
identify a medical bill transmitted to the party for the first MP and based on the entry, wherein the medical bill is transmitted after creation of the entry and before creation of the adjusted entry;
determine that the medical bill is invalid based on the adjusted entry; and
transmit a message to the party indicating that that medical bill is invalid.

20. The non-transitory computer readable storage medium of claim 11, the instructions further comprising functionality for:
marking the financial responsibility as a disputed amount;
automatically populating a dispute letter for the disputed amount comprising the financial responsibility of the party; and
electronically sending the dispute letter to the MIP.

21. The non-transitory computer readable storage medium of claim 11, the instructions further comprising functionality for:
identifying a medical bill transmitted to the party for the first MP and based on the entry, wherein the medical bill is transmitted after creation of the entry and before creation of the adjusted entry;
determining that the medical bill is invalid based on the adjusted entry; and
transmitting a message to the party indicating that that medical bill is invalid.

* * * * *